No. 698,035. Patented Apr. 22, 1902.
D. W. MANNIE.
ATTACHMENT FOR CRACKER, BISCUIT, OR CAKE MACHINES.
(Application filed Dec. 19, 1901.)
(No Model.) 2 Sheets—Sheet 1.

WITNESSES:
C. H. Walker
H. H. Johnson

INVENTOR.
Daniel W. Mannie,
BY Eugene W. Johnson
Attorney

No. 698,035. Patented Apr. 22, 1902.
D. W. MANNIE.
ATTACHMENT FOR CRACKER, BISCUIT, OR CAKE MACHINES.
(Application filed Dec. 19, 1901.)
(No Model.) 2 Sheets—Sheet 2.

WITNESSES:
C. H. Walker.
H. H. Johnson

INVENTOR.
Daniel W. Mannie,
BY Eugene W. Johnson
Attorney

UNITED STATES PATENT OFFICE.

DANIEL W. MANNIE, OF MACON, GEORGIA.

ATTACHMENT FOR CRACKER, BISCUIT, OR CAKE MACHINES.

SPECIFICATION forming part of Letters Patent No. 698,035, dated April 22, 1902.

Application filed December 19, 1901. Serial No. 86,605. (No model.)

*To all whom it may concern:*

Be it known that I, DANIEL W. MANNIE, a citizen of the United States, residing at Macon, in the county of Bibb and State of Georgia, have invented new and useful Improvements in Attachments for Cracker, Biscuit, or Cake Machines, of which the following is a specification.

This invention relates to certain new and useful improvements in attachments for cracker, biscuit, or cake making machines, the object being to provide means whereby one of the dough-compressing rollers may have oil applied to the surface thereof, the roller having subsequently applied thereto flour, sugar, or other pulverulent material, which is placed upon the dough with the oil by the roller.

Another object of the invention is to provide a sifter of improved construction which is combined with a scraper and oil-chamber, said parts being located above one of the rolls of the machine to which it is applied for the purposes as will be hereinafter set forth.

Figure 1:
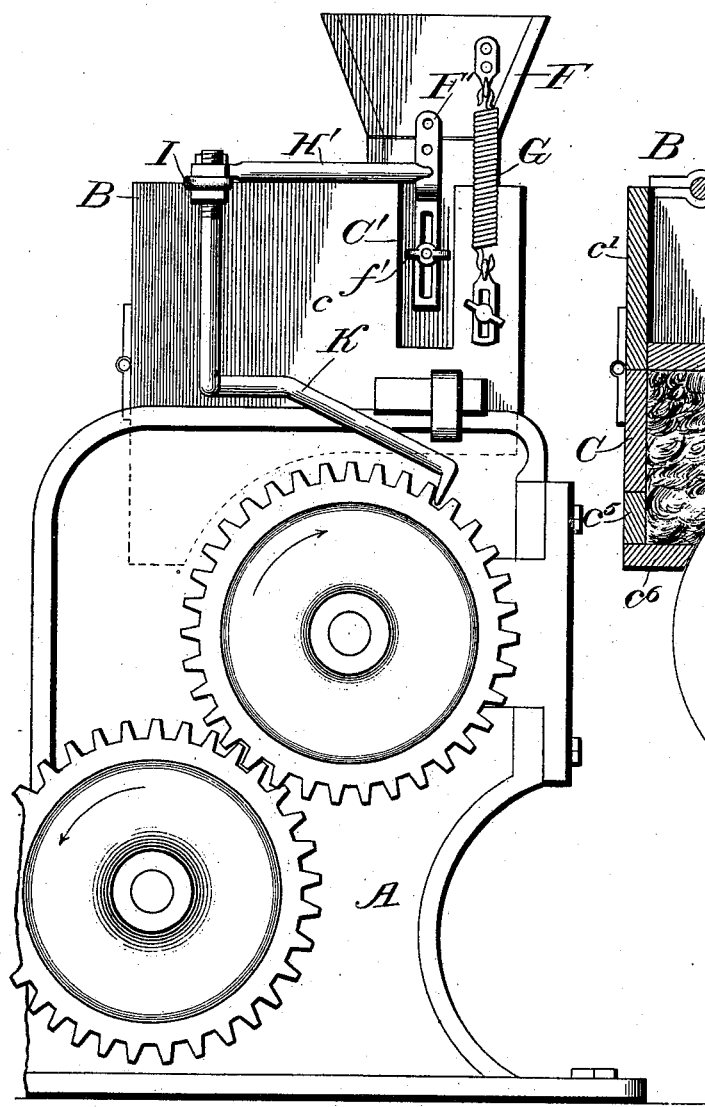
Figure 2:
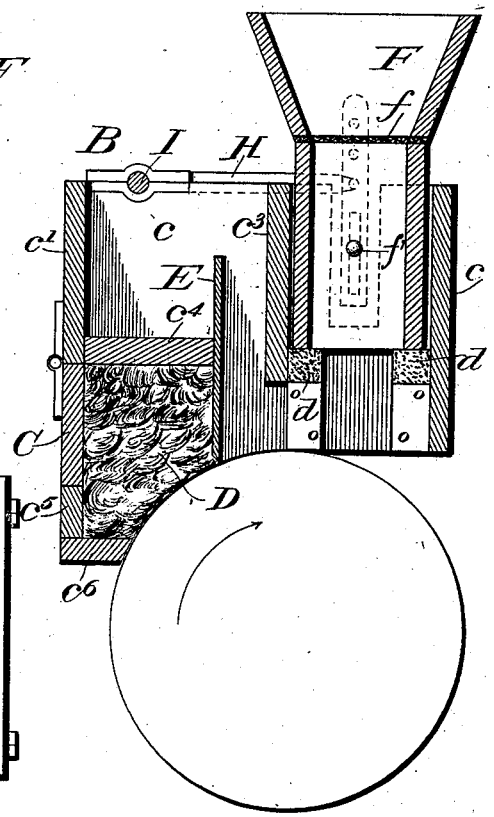
Figure 3:
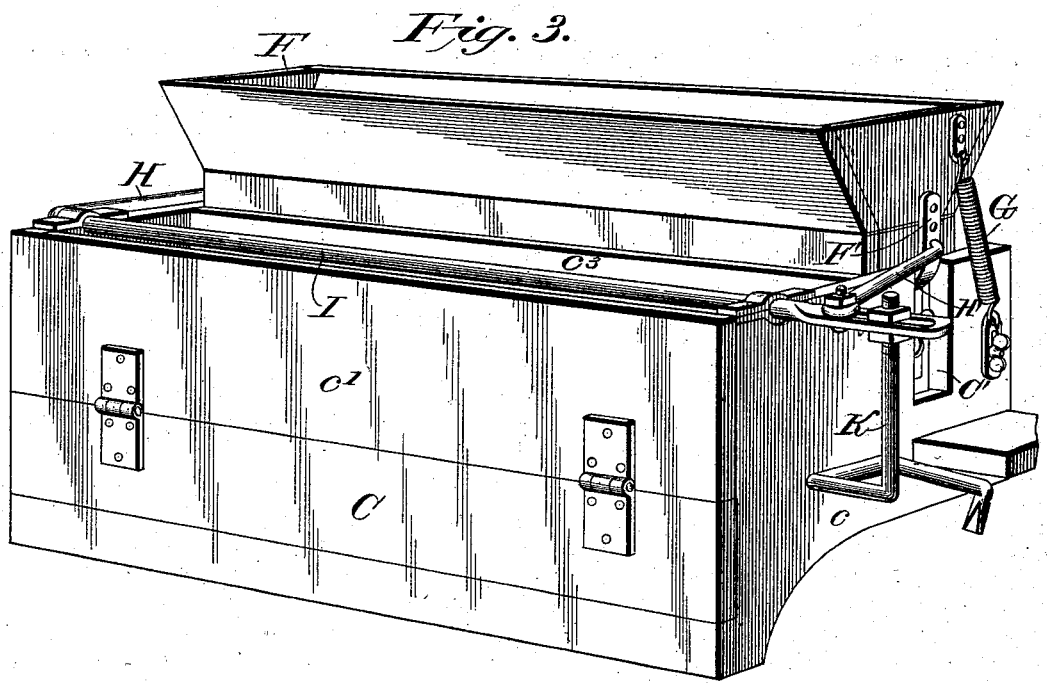
Figure 4:
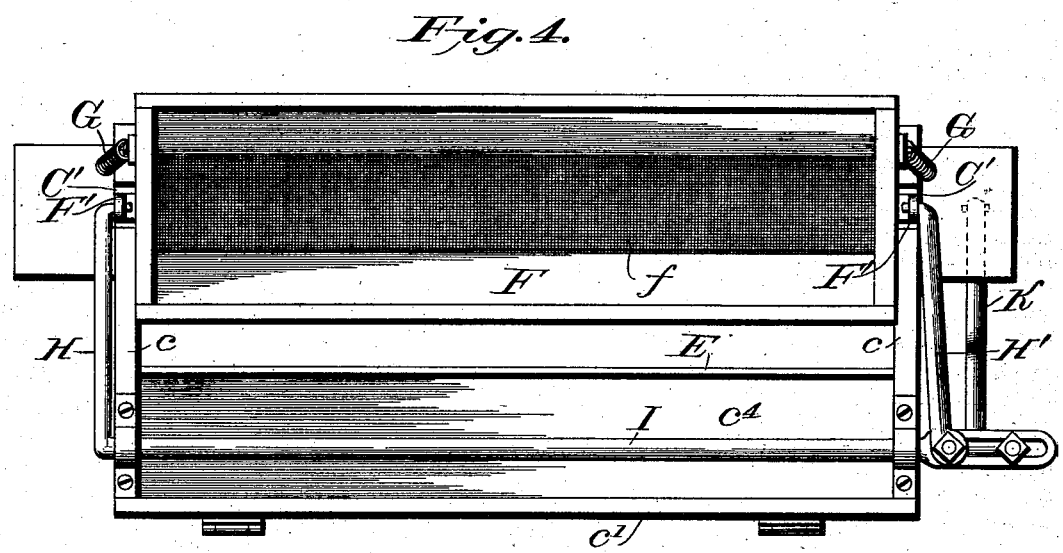

In the drawings I have shown one embodiment of my invention, such form being intended to be used in connection with the usual cracker, biscuit, or cake making machine, and in said drawings, Figure 1 is a side elevation showing a portion of the frame of the machine with my invention applied thereto. Fig. 2 is a vertical sectional view. Fig. 3 is a perspective view of the attachment separated from the machine, and Fig. 4 is a plan view.

A portion of the frame A of the cracker, biscuit, or cake machine is shown in Fig. 1 of the drawings, and such machine has the usual rollers, carrier-belts, and other parts, which are mounted between side frames. Upon the portion of the frame A having the final compression-rolls I mount, so as to be above the top roll, my attachment B, which is made up to constitute a frame having end pieces $c\ c$, which are rigidly connected by cross-pieces $c'\ c^2\ c^3\ c^4\ c^5\ c^6$ to provide a rigid structure, the same having at its front a door C. The side pieces of the frame are cut away to provide openings C' about midway between the rear vertical wall $c^2$ and the partition $c^3$, and to the inner sides of the end pieces are attached cushions $d$, which may be blocks of resilient material, as felt or rubber, such blocks resting upon pieces attached to the ends of the frame. The lower portion of the sifter will abut against these resilient blocks on its downward movement, which is accelerated by springs attached to the hopper and to the frame. A transverse horizontal partition $c^4$ forms the upper part of a chamber D, in which is placed cotton-waste or other absorbent material, and the rear wall of this chamber is made up of a blade or scraper E, the lower edge thereof being beveled. This blade is held in place by vertical recesses in the ends of the end pieces of the frame and rests upon the surface of the roller. A hopper F is shown, having a sieve $f$, and beneath the sieve a rectangular depending portion the downward movement of which is limited by the cushions $d\ d$, springs G G being attached to the hopper and to the end pieces of the frame, one of the connecting means being adjustable to change the tension of the springs when desired. The sides of the hopper F opposite the opening C' have attached thereto, by means of set-screws $f'$, slotted plates F', said plates being bent outward and being perforated for the engagement therewith of arms H H', which are connected to a rock-shaft I, mounted in suitable bearings on the end pieces of the frame. The rock-shaft I has one end bent to form the arm H, and the other end is slotted for attachment thereto of an arm H' and of a bent arm K, which is intended to engage the teeth of one of the gear-wheels of the machine to which the attachment is applied, which gear-wheel will oscillate the rock-shaft, the arms imparting to the hopper a vertical reciprocating movement, which will dust the flour, sugar, or other material placed on the sieve upon the roller which is beneath the hopper. The frame has side extensions or lugs to which clamps are attached for connecting the attachment to the frame of the machine.

In practice the chamber D is filled with cotton-waste, which is saturated with oil or grease, preferably lard, butter, or cotton-seed oil, the latter being the oil now most generally used. The material to be dusted upon the surface of the cakes, biscuits, or crackers is deposited in the hopper, and when the machine is in operation the oil or grease will be applied to the surface of the roller. The knife will remove any surplus dough from the roller and the pulverized material is deposited on the oiled surface of the roller and coming in contact with the dough will be placed on its surface, the oil or grease being on the top of the dough, so that when the cakes, biscuits, or crackers are placed in the oven to be baked they will be browned, owing to the presence of the oil thereon. It will be noted that the oil is first deposited on the roller. This will cause the flour, sugar, or other pulverulent material to adhere to the roller, and as the roller compresses the dough the pulverulent material will be placed upon the dough, the oil being on the upper surface thereof.

Having thus described my invention, what I claim as new, and desire to secure by Letters Patent, is—

1. An attachment for biscuit, cake or cracker machines consisting, of a frame having means for applying oil or grease to the face of a roller of the machine, and means for subsequently depositing a pulverulent material on the oiled or greased face of the roller.

2. In combination with a compression-roller, of a biscuit, cake or cracker machine, of a frame having a chamber which is adapted to receive an absorbent material which is saturated with oil and means for depositing pulverulent material upon the oiled surface of the roller.

3. In a dough-preparing machine, the combination with a roller, means for applying oil to the surface of the roller, means for subsequently dusting the roller with a pulverulent material which is placed on the dough so that the oil will be uppermost, for the purpose set forth.

4. In a dough-preparing machine, the combination with one of the compression-rolls thereof, of means for applying an oleaginous substance to the surface of the roll, a vertically-vibrated hopper for applying a pulverulent material therefrom upon the oiled surface of the roll, for the purpose set forth.

5. In combination with a compression-roll of a cracker, biscuit or cake forming machine, of a frame having a compartment which is open to the roll, a scraper, and a vertically-vibrated hopper, substantially as shown.

6. An attachment for cracker, biscuit or cake forming machines, consisting of a frame having a chamber which is open to a compression-roller of the machine, a scraper, a hopper maintained to be susceptible of a vertical movement in the frame, a sieve carried by the hopper, cushions with which the hopper contacts, a rock-shaft having arms which engage the hopper, means for rocking the shaft, and springs to effect a quick return of the hopper, substantially as shown and for the purpose set forth.

In testimony whereof I have hereunto set my hand in presence of two subscribing witnesses.

DANIEL W. MANNIE.

Witnesses:
J. J. WILSON WOOD,
H. HECHHEIMER.